United States Patent
Kemper et al.

[15] 3,648,523
[45] Mar. 14, 1972

[54] UNIFORM TEMPERATURE REFERENCE APPARATUS

[72] Inventors: Clarence A. Kemper, Lexington; Richard H. Eastman, Needham; John H. Leigh, Canton, all of Mass.

[73] Assignee: Joseph Kaye & Company, Cambridge, Mass.

[22] Filed: Jan. 22, 1970

[21] Appl. No.: 4,976

[52] U.S. Cl. ............................73/361, 73/341, 165/47, 165/185
[51] Int. Cl. ............................................G01k 5/52
[58] Field of Search .............73/361, 341; 165/80, 135, 185, 165/47; 317/100, 234; 126/400

[56] References Cited

UNITED STATES PATENTS

| 2,054,953 | 9/1936 | Scotson | 165/185 X |
| 3,069,909 | 12/1962 | Hines | 73/361 |
| 3,086,283 | 4/1963 | Webber et al. | 165/80 X |
| 3,216,496 | 11/1965 | Katz | 165/185 |
| 3,220,471 | 11/1965 | Coe | 165/80 X |
| 3,242,354 | 3/1966 | Novack et al. | 165/135 X |
| 3,249,817 | 5/1966 | Sinclair et al. | 317/100 |

FOREIGN PATENTS OR APPLICATIONS

| 985,671 | 3/1965 | Great Britain | 317/234 A |
| 1,402,413 | 5/1965 | France | 317/234 A |
| 1,403,579 | 5/1965 | France | 317/234 A |

Primary Examiner—Albert W. Davis, Jr.
Attorney—Rines and Rines

[57] ABSTRACT

This disclosure deals with an array of terminal blocks electrically insulated from one another but thermally interconnected with high-thermal conductivity therebetween to provide a uniform temperature reference system, usable within thermally insulated enclosures, for multiple thermocouple or other electrical connections to the array.

14 Claims, 1 Drawing Figure

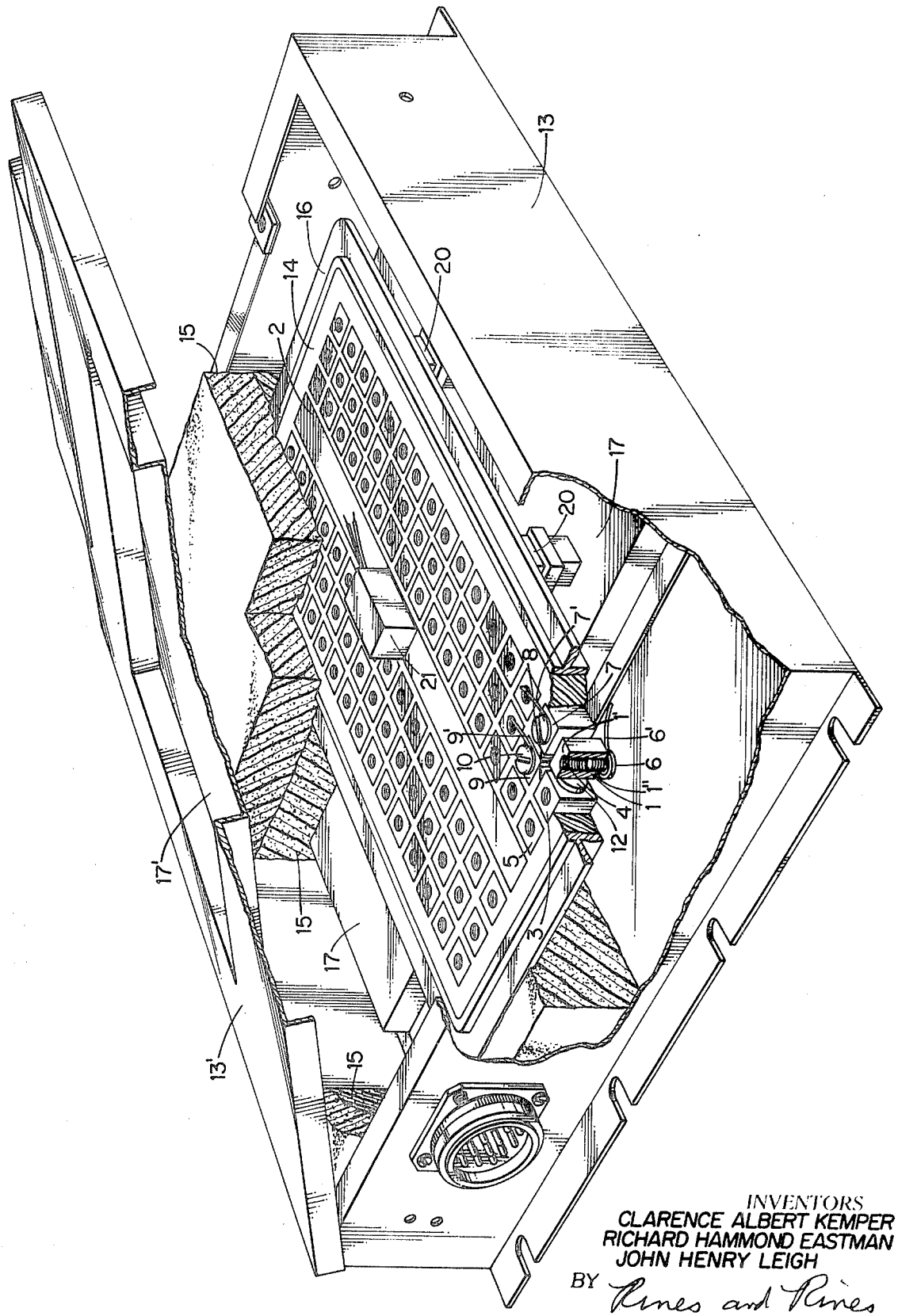

UNIFORM TEMPERATURE REFERENCE APPARATUS

The present invention relates to uniform temperature reference apparatus, being more particularly directed to an array of passive signal-conditioning terminal units that may be used as a reference for a plurality of thermocouples, or as a thermal-free, no-noise panel for the connection of other types of low-level transducers such as pressure transducers, strain gauges, resistance temperature detectors, or any input signal device in, for example, the microvolt range requiring electrically clean and thermal-free signal conditioning.

Prior systems for providing a simultaneous uniform temperature reference for a plurality of thermocouple transducers or sensors, for example, have either required complex temperaure-controlling apparatus for maintaining the junctions of the thermocouples at different locations at nearly the same or uniform temperature, or have accepted the relatively large tolerances in deviation from the desired "uniform" value, as a practical necessity. In accordance with the present invention, however, this problem has been admirably obviated, and a substantially uniform temperature reference is now achievable with simple apparatus and with a high degree of constancy in the reference temperature for a wide array of transducer elements.

An object of the invention, accordingly, is to provide a new and improved uniform temperature reference apparatus that overcomes the above-described disadvantages.

A further object is to provide a novel uniform temperature-reference and thermally insulated enclosure combination, as well.

Still another object is to provide a novel thermocouple apparatus of more general utility.

Other and further objects will be explained hereinafter and are more particularly pointed out in the appended claims. In summary, however, from one of its aspects, the invention contemplates an array of similar terminal blocks each provided with means to connect two wires, preferably one wire each at its front and rear faces, each terminal block being connected to adjacent blocks with elements of high thermal conductivity but low electrical conductivity disposed therebetween so that the terminal blocks are electrically insulated from one another but are at substantially the same temperature.

The invention will now be described with reference to the accompanying drawing, the single FIGURE of which is an isometric view, illustrating the invention in preferred form, with parts shown broken away to present details of construction.

Referring to the drawing, the array is illustrated as made up of a plurality of prismatic metal terminal blocks 1, 3, 5, 7, 9, etc., arranged in transverse rows extending on opposite sides of a longitudinally extending metal bar 2 at successive points therealong. Each terminal block is preferably of copper, preferably nickel-plated to provide a hard and corrosion-resistant surface, and is apertured (as at 4 in the terminal 1) at its front and rear surfaces (1' and 1") to receive binding terminal posts, such as the lower terminal screw post 6 (shown at the terminal block rear face 1") and the upper screw terminals 8 and 10, (shown associated with respective terminal blocks 7 and 9). Thus, a transducer or sensor input connection, such as a thermocouple wire, may be connected to the upper face of the terminal block to form a thermocouple therewith. Such thermocouple reference junctions are shown provided between thermocouple wires 7' and 9', respectively contacted with the upper faces of the copper block terminals 7 and 9, by the corresponding binding terminal posts or screws 8 and 10. A similar junction (not shown) may be effected at the front surface 1' of terminal block 1, and the other terminal blocks, as desired. Output connections may be taken from the rear block surfaces, such as the copper output lead 6' at the rear face 1" of terminal block 1.

In accordance with the invention, each such thermocouple reference junction or other sensor connection to a front face of a terminal block is electrically insulated and thus isolated from adjacent terminal blocks by a spacer element as of beryllium oxide, one of which is shown for illustrative purposes at 12 soldered on metallized surfaces thereof between the adjacent sides of adjacent terminal blocks 1 and 3. While adjacent terminal blocks, such as 1 and 3, are thus provided with electrical insulation therebetween, they are thermally connected together as a result of the high thermal conductivity displayed by beryllium oxide. Advantage is thus taken of the high electrical resistivity (about $10^{16}$ ohm-cm. at 70° F.), the low dielectric constant (about 6.57 at 70° F.) and the high thermal conductivity (about 140 btu/hr.-ft.-°F. at 70° F.) of the beryllium oxide element 12, electrically to isolate adjacent terminal blocks from one another and from the common bar 2, but thermally to connect the same together to provide a high degree of temperature uniformity throughout the array. Other similar-propertied elements, such as aluminum oxide, may be similarly employed. For mechanical and electrical purposes, moreover, the whole array 1–12–3.....2, etc., may be embedded in an epoxy or other insulating medium 14 contained within a panel mounting frame 16, the spacing between the terminal blocks enabling the use of multiple connecting leads and the like.

As an example of the efficacy of this type of construction, in an array of 96 terminal blocks constructed as shown in the drawing, each block being about one-half inch in square cross section and about five-eighths of an inch long and with metallized beryllium wafer elements 12 about three-eighths of an inch in diameter and about fifty thousandths of an inch thick, no two points of the array will differ in temperature by even as much as one-tenth of a degree fahrenheit when the array is mounted in a suitable enclosure, even when the ambient temperature varies by 10° or 20° F. The value of the uniform temperature of the array may be monitored and thus determined by any desired sensor, such as a resistance temperature detector or thermocouple 21, as is well-known.

An enclosure for the array is shown having a base 13 and a lid 13' which, when assembled, will enclose the array with thermal insulation, such as polyester foam 15, disposed within the enclosure to provide thermal isolation of the array from ambient environmental temperature differences. The array is shown supported upon insulating mounts 20. Since, in a simple boxlike enclosure, the terminal blocks at the longitudinal ends of the array receive heat from the walls at a more rapid rate than the terminal blocks of the more central portion of the array, compensation is desirable by increasing the thermal conductance between the ambient environment and the central portion of the array in order to balance out such end effects. This is shown effected by recessing the portion of the upper and/or lower walls of the base 13 and 13' adjacent the central portion of the array, as shown at 17 and 17', respectively, so as to provide less insulation 15 between the ambient environment and the central terminal blocks than between the ambient environment and the ends.

Other equivalent compensation constructions may obviously be used, as may further modifications be made by those skilled in the art, all within the spirit and scope of the invention as defined in the appended claims.

What is claimed is:

1. A uniform temperature thermocouple reference apparatus having, in combination, an array of similar metal terminal blocks each provided with means to connect two conductors, each terminal block being connected to adjacent blocks with elements of high thermal conductivity but low electrical conductivity disposed therebetween so that the terminal blocks are electrically insulated from one another but are at substantially the same temperature, and conductor means connected to certain of said blocks and composed of material dissimilar to that of the associated blocks for effecting thermocouple reference junctions therewith.

2. A uniform temperature reference apparatus as claimed in claim 1 and in which the array of blocks, except for the means to connect said conductors, is embedded in an electrically insulating medium.

3. A uniform temperature reference apparatus as claimed in claim 1 and in which the front and rear faces of the terminal blocks contain apertures, for conductor terminals to establish electrical connection with the terminal blocks.

4. A uniform temperature reference apparatus as claimed in claim 3 and in which said elements are disposed between adjacent sides of adjacent terminal blocks.

5. A uniform temperature reference apparatus as claimed in claim 3 and in which said terminal blocks are of copper and the front face conductor terminals are provided with thermocouple wire input connections constituting said conductor means to form said reference junctions between said thermocouple wires and the corresponding terminal blocks.

6. A uniform temperature reference apparatus as claimed in claim 5 and in which the rear face conductor terminals are provided with copper wire output connections.

7. A uniform temperature reference apparatus as claimed in claim 6 and in which monitoring means is thermally connected with said array to indicate the said uniform temperature thereof.

8. A uniform temperature reference apparatus as claimed in claim 1 and in which the said array comprises a plurality of transverse branches of terminal blocks extending on opposite sides of and from successive points along a common longitudinally extending metal bar.

9. A uniform temperature reference apparatus as claimed in claim 1 and in which said array is disposed within an enclosure provided with thermal insulation means disposed between the array and the ambient environment at the outer walls of the enclosure.

10. A uniform temperature reference apparatus as claimed in claim 9 and in which means is provided for supplying greater thermal conductance between said ambient environment and the central portion of the said array than at the ends of the array.

11. A uniform temperature reference apparatus as claimed in claim 10 and in which said last-named means comprises a recessed section in at least one of said outer walls of the enclosure opposite said central portion of the said array providing less of said thermal insulation between the outer walls of the enclosure and said central portion of the said array than at the ends thereof.

12. A uniform temperature reference as claimed in claim 1 and in which said terminal blocks are of copper and said elements comprise berylium oxide wafers connected therebetween.

13. A uniform temperature thermocouple reference apparatus having, in combination, an array of terminal blocks for thermocouple junction connections and the like, an enclosure containing said array and provided with thermal insulation means disposed between the array and the ambient environment at outer walls of the enclosure, means for providing greater thermal conductance between said ambient environment and the central portion of the said array than at the ends thereof, and conductor means connected to certain of said blocks and composed of material dissimilar to that of the associated blocks for effecting thermocouple reference junctions therewith.

14. A uniform temperature reference apparatus as claimed in claim 13 and in which said providing means comprises a recessed section in at least one of said outer walls of the enclosure opposite said central portion of the said array providing less of said thermal insulation between the outer walls of the enclosure and said central portion of the said array than at the ends thereof.

* * * * *